Nov. 21, 1967     J. R. BRAY ETAL     3,354,358
ANTICIPATING TEMPERATURE CONTROLLER
Filed July 1, 1963
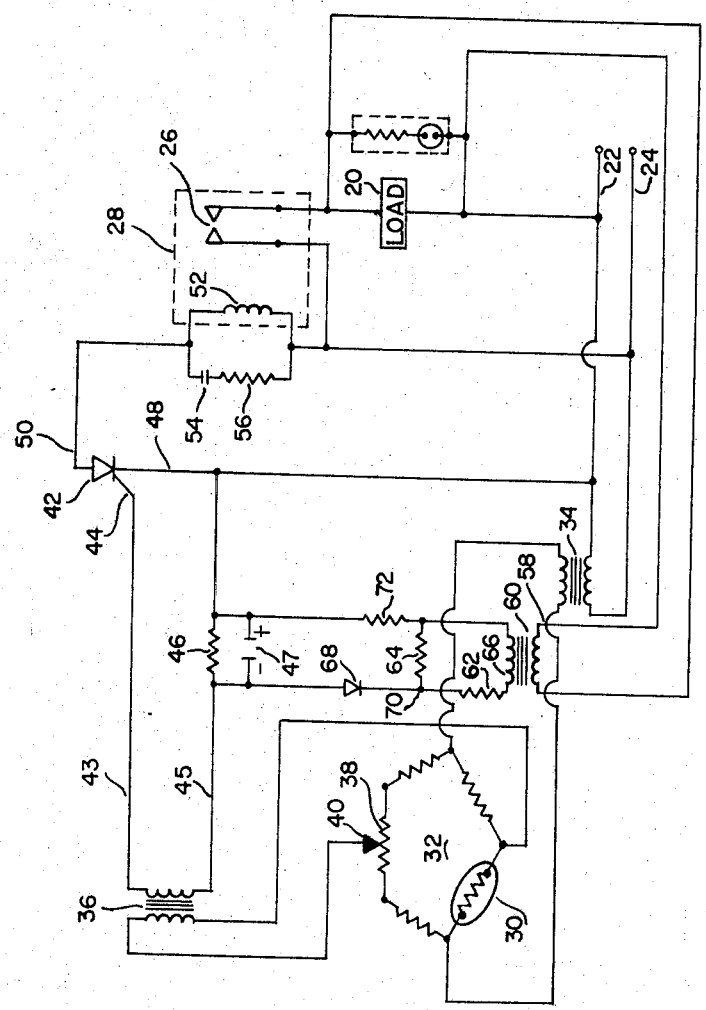
INVENTORS.
JOHN R. BRAY
GEORGE B. PRICE

United States Patent Office 3,354,358
Patented Nov. 21, 1967

3,354,358
ANTICIPATING TEMPERATURE CONTROLLER
John R. Bray and George Bernard Price, Pensacola, Fla., assignors to Monsanto Company, a corporation of Delaware
Filed July 1, 1963, Ser. No. 291,892
1 Claim. (Cl. 317—148.5)

This invention relates to temperature control circuits, and more particularly to such control circuits using solid state switching means and a particular feedback for decreasing the temperature error introduced by a change in thermal loading.

Temperature controllers according to the prior art are usually either of the on-off type or have some sort of feedback arrangement, such as U.S. Patent 3,042,781 by John R. Bray. In the feedback type of temperature controller, power is applied to the temperature sensing circuit at the same time that power is applied to the heater, to thereby modify the characteristics of the control circuit and reduce the amplitude of temperature fluctuations of the controlled element. According to the present invention these fluctuations are reduced still further by the circuit configuration and ranges of component values hereinafter described.

Accordingly a primary object of the invention is to provide temperature controller circuits using a solid state switching element.

A further object is to provide control circuits of the above character wherein the temperature offset caused by differences in thermal loading is minimized.

A further object is to provide control circuits of the above character wherein such reduction in temperature offset is achieved by particular arrangement of the feedback circuit.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a more complete understanding of the nature and objects of the invention, reference should be made to the following detailed description taken in connection with the accompanying drawing, in which the figure is a schematic circuit diagram of a preferred and exemplary embodiment of the invention.

Referring now to the drawing, the circuit includes a heater load 20, the temperature of which is to be maintained at a predetermined temperature. Load 20 is supplied with power from power supply conductors 22 and 24. Conductor 22, as illustrated, may be directly connected to one side of the load 20, while conductor 24 is connected through the contacts 26 of a relay 28 to the opposite side of load 20 when relay 28 is actuated.

The temperature of load 20 is sensed by a thermistor 30 placed in thermal contact with load 20 and connected in one leg of an AC Wheatstone bridge 32. A transformer 34 supplies power to one diagonal of bridge 32. The other diagonal of bridge 32 is connected to the primary winding of a transformer 36, the secondary winding of which provides an error signal. The bridge output signal may be derived from a variable tap 40 on a potentiometer resistor 38 incorporated as part of bridge 32 so that the desired operating temperature of load 20 may be selected by proper positioning of the tap 40.

The bridge output signal appearing at the secondary winding of transformer 36 is applied to control a silicon controlled rectifier 42. As illustrated, one terminal 43 of the secondary winding of transformer 36 is connected to the gate electrode 44 while the remaining terminal 45 is connected through a resistor 46 and shunt capacitor 47 to the cathode 48 of rectifier 42. Transformer 36 should be connected so that the induced voltage at terminal 43 is in phase with the voltage on supply conductor 24. Cathode 48 is directly connected to power supply conductor 22, and anode 50 is connected through the winding 52 of relay 28 to the remaining power supply conductor 24, whereby current is supplied through rectifier 42 to energize relay 28 when the positive peaks of the error signal applied between gate electrode 44 and cathode 48 are above the firing potential of rectifier 42. A series connected capacitor 54 and resistor 56 shunt winding 52 of relay 28 to smooth the rectified pulses supplied by rectifier 42 and maintain relay 28 energized between successive half-wave pulses produced by rectifier 42. During positive half cycles applied to the anode from conductor 24, capacitor 54 charges up, and discharges through winding 52 during negative half cycles when rectifier 42 cannot conduct.

A feedback network is provided for modifying the operation of the circuit so as to provide much closer control of the temperature of load 20. The primary winding 58 of a feedback transformer 60 is connected in parallel with load 20, so that transformer 60 is energized whenever relay 28 is actuated. A voltage divider comprising resistors 62 and 64 is connected across the secondary winding 66 of feedback transformer 60. A diode 68 has its cathode connected to the junction 70 between resistors 62 and 64, and has its anode connected to terminal 45 of the secondary winding of transformer 36, A charging resistor 72 connects the junction 74 between resistor 64 and winding 66 to cathode 48 of rectifier 42 to complete the exemplary feedback circuit.

When power is applied to load 20, feedback transformer 60 is simultaneously energized to supply current to modify the operation of rectifier 42. The fraction of the voltage appearing across resistor 64 is rectified by diode 68 and applied to capacitor 47 as an exponentially increasing biasing signal having a polarity such as to oppose conduction in the gate-to-cathode circuit of rectifier 42. Thus, the error signal from bridge 32 appearing on terminals 43 and 45 can cause rectifier 42 to conduct only when it exceeds the biasing voltage appearing across capacitor 47 by an amount exceeding the firing potential of rectifier 42.

If the sensed temperature is far enough below the desired temperature as provided by the setting of tap 40, the error signal on terminals 43 and 45 will override the biasing voltage across fully charged capacitor 47 and will fire rectifier 42 each time that conductor 24 is positive. This maintains contacts 26 closed and applies full power to load 20.

As the temperature of load 20 increases, the bridge error signal decreases until at some temperature slightly below the desired temperature the sum of the error signal and the biasing voltage is insufficient to fire rectifier 42. Relay 28 then releases, de-energizing load 20 and feedback transformer 60. Capacitor 47 discharges through resistor 46, lowering the biasing voltage until the composite error signal and biasing voltage again is large enough to fire rectifier 42. Relay 28 is then again actuated, applying power to load 20 and to the feedback network. The feedback current is rectified by diode 68 and charges capacitor 47 until the composite error signal and biasing voltage again decreases to less than the firing voltage of rectifier 42. This cyclic operation is continuously repeated as the temperature of load 20 approaches and remains at the desired temperature.

It has been found that much closer temperature regulation can be maintained if the time constants associated with the charging and discharging of capacitor 47 are properly selected. Optimum control and stability of operation are achieved if these time constants are so selected that, at the desired temperature, power is applied to the load for between 0.1 and 1.5 seconds before the biasing voltage across capacitor 47 increases sufficiently to reduce the composite signal applied to gate 44 to below the firing voltage of rectifier 42. Similarly, the discharge rate of capacitor 47 preferably is such that relay 28 is held de-energized from 0.1 to 2 seconds.

Exemplary component values suitable when the AC power supply connected to terminals 22 and 24 is 110 volts, and when the rectifier 42 is a General Electric Company Type C5B, may include the following:

| | | |
|---|---|---|
| Resistor 46 | kilohms | 27 |
| Resistor 62 | do | 100 |
| Resistor 64 | do | 51 |
| Resistor 72 | do | 51 |
| Capacitor 47 | microfarads | 50 |
| Resistor 56 | ohms | 250 |
| Capacitor 54 | microfarads | 5 |

Relay 28 may be a commercially available mercury relay. Selection of component values to provide the operation described above may be readily made by those skilled in the art.

The use of a silicon controlled rectifier for controlling the relay confers all the usual advantages of solid state circuitry, such as reduced cost and size, reliability and economical operation. Proper selection of the component values in the feedback network minimizes the temperature offset caused by differences in thermal loading, and greatly increases accuracy of control. In addition, if the time constants in the feedback network are selected to be within the ranges indicated above, further substantial improvements in accuracy of control and stability of operation are achieved. The resulting circuit is simple and economical both in original cost and in operation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

Apparatus for controlling a heater, comprising in combination:
(a) a bridge having therein a thermistor thermally coupled to said heater for sensing the temperature thereof and producing a control signal having a magnitude varying with deviations of the sensed temperature from a predetermined value,
(b) a silicon controlled rectifier having gate, cathode, and anode electrodes,
(c) AC power supply terminals,
(d) switching means, connected in series with said anode and said cathode electrodes across said power supply terminals, for connecting said heater across said power supply terminals when said rectifier conducts,
(e) an input circuit connected for applying said control signal across said gate and cathode electrodes, said input circuit including a series capacitor,
(f) a feedback network, energized by actuation of said switch means, for applying a charge to said capacitor opposing conduction of said rectifier, said network including series charging resistance for controlling the charging time constant of said capacitor,
(g) and a discharging resistor connected in parallel with said capacitor for controlling the discharging time constant of said capacitor,
(h) the impedances of said resistor, said resistance, and said capacitor being selected so that said silicon control rectifier is alternately enabled to conduct between 0.1 and 1.5 seconds and prevented from conducting between 0.1 second and 2.0 seconds.

References Cited

UNITED STATES PATENTS 3,098,920   7/1963   Bray _____ 219—499

MILTON O. HIRSHFIELD, *Primary Examiner.*

S. BERNSTEIN, M. L. LEVY, *Examiners.*

L. T. HIX, *Assistant Examiner.*